US006816595B1

(12) United States Patent
Kudo (10) Patent No.: US 6,816,595 B1
(45) Date of Patent: Nov. 9, 2004

(54) MINI TIME KEY CREATION METHOD AND SYSTEM

(75) Inventor: Michiharu Kudo, Kamakura (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/272,873

(22) Filed: Mar. 19, 1999

(30) Foreign Application Priority Data

Mar. 23, 1998 (JP) .......................................... 10-073656

(51) Int. Cl.[7] .............................................. H04L 9/00
(52) U.S. Cl. ........................... 380/277; 380/44; 380/45; 380/46
(58) Field of Search ........................... 380/277, 44, 45, 380/46

(56) References Cited

U.S. PATENT DOCUMENTS

| | | | | |
|---|---|---|---|---|
| 4,926,480 A | * | 5/1990 | Chaum ........................ | 235/379 |
| 5,231,666 A | * | 7/1993 | Matyas ........................ | 705/66 |
| 5,237,614 A | * | 8/1993 | Weiss ......................... | 713/159 |
| 5,297,207 A | * | 3/1994 | Degele ........................ | 380/46 |
| 5,432,852 A | * | 7/1995 | Leighton et al. .............. | 380/30 |
| 5,594,794 A | * | 1/1997 | Eyer et al. ................... | 380/231 |
| 5,668,877 A | * | 9/1997 | Aziz .......................... | 380/285 |

OTHER PUBLICATIONS

Schneier, Bruce, Applied Cryptography, 1996, John Wiley & Sons, Inc., Second Edition, p. 53.*

* cited by examiner

Primary Examiner—Justin T. Darrow
Assistant Examiner—Cas Stulberger
(74) Attorney, Agent, or Firm—William A. Kinnaman, Jr.

(57) ABSTRACT

To provide a method and a system for creating a mini time key from a time key, a plurality of mini time keys are created within a unit time period. First, a unit time decryption key is prepared immediately after the unit time is created. Then, the last mini time key is created by applying a one-way function to the unit time decryption key. A desired mini time key is created by applying the one-way function to a mini time key following the desired mini time key. In other words, the mini time keys are created as a timed series arranged in a descending order beginning with the last mini time key. In this manner, even when a specific mini time key is externally leaked for a specific reason, a following mini time key in a timed series can not be created by using this mini time key. In addition, even when the mini time keys are sequentially published, the security of the unit time decryption key is maintained.

12 Claims, 7 Drawing Sheets

Mini time key creation method

Transient relationship between unit time key and mini time key

Fig. 1

Mini time key creation method

Fig. 2

Method for managing a mini time key and a unit time key

Network examination system

Fig. 5

Example electronic sealed — bid auction application

MINI TIME KEY CREATION METHOD AND SYSTEM

BACKGROUND OF THE INVENTION

1. Field of the Invention

The present invention relates to a technique for creating a mini time key from a time key with which decryption at a specific time is enabled, and in particular to a technique for reducing the size of the time unit allocated for decryption using a mini time key without a corresponding increase in the number of time keys.

2. Description of the Related Art

In the present invention, a mini time key creation method and a management (transmission and maintenance) method for its use will be explained. Generally, the number of time keys to be managed is increased in order to reduce the unit time allocated for decryption. However, according to the present invention, the unit time can be shortened without a corresponding increase in the number of time keys that are to be managed.

The time key is used for a system to prevent the decryption of data until a specific time has been reached. In this system, a time key manager that manages a time encryption key keeps a time decryption key secret until a specific time, and after that, releases the time decryption key for public use.

In order to shorten the unit time allocated for decryption, many time keys that correspond to the unit time must be created. For a unit time of one day, for example, 365 time keys must be created and managed for one year (a time key for Jan. 16, 1998 or a time key for Jan. 17, 1998). However, for a unit time of one minute, 525,600 time keys must be created and managed for one year (a time key for 10:28 AM on Jan. 16, 1998 or a time key for 10:29 AM on Jan. 16, 1998). As is described, the number of time keys to be managed is normally increased in order to reduce the unit time allocated for decryption. Since a system having the highest security is required for the management of the time keys, the creation of as small as possible number of time keys is desired. Taking into consideration an application that uses a time key, the shorter the unit time is allocated for decryption, the more flexibly can the operation be performed.

A time key employing asymmetric key encryption is described in "Secure Electronic Sealed-Bid Auction Protocol With Public Key Cryptography," M. Kudo, IEICE Trans. Fundamentals Of Electronics, Communications And Computer Sciences, Vol. E81-A, No. 1, 1998. And a time key employing symmetric key encryption is described in "Time-Lock Puzzles And Timed-Release Crypto," R. L. Rivest, A. Shamir and D. A. Wagner, NIT Laboratory For Computer Science, pp. 1–9, 1996 Time-Lock Puzzles. Both references are concerned with the unit time key, and do not teach the method of the present invention whereby a mini time key is created from a unit time key in order to reduce the time unit allocated for decryption without a corresponding increase in the number of time keys.

It is, therefore, one object of the present invention to provide a method and a system for creating a mini time key from a time key.

It is another object of the present invention to provide a method and a system for performing encryption using a mini time key and a unit time key.

It is an additional object of the present invention to provide a method and a system for transmitting a mini time key and a unit time key.

It is a further object of the present invention to provide a method and a system for decrypting encrypted data using a mini time key and a unit time key.

It is still another object of the present invention to provide a time key server with which a user can freely use a mini time key and a unit time key.

It is a still additional object of the present invention to provide a time key management method whereby a time key management function does not have to manage an enormous number of time keys when using a mini time key and a unit time key, and a time key management system.

SUMMARY OF THE INVENTION

To achieve the above objects, a plurality of mini time keys are created within a unit time period that correspond to respective subintervals of the unit time period. First, a unit time decryption key is prepared immediately after the unit time period is reached. Then, a mini time key for the last subinterval of the unit time period is created by applying a one-way function to the unit time decryption key. A mini time key for each subinterval before the last subinterval is then created by iteratively applying a one-way function to the mini time key created for the following subinterval, beginning with the last subinterval and ending with the first subinterval of the unit time period. In other words, the mini time keys are created as a timed series arranged in a descending order beginning with the mini time key created for the last subinterval. In this manner, even when a specific mini time key is externally leaked for a specific reason, a mini time key for a later subinterval in a timed series can not be created by using this mini time key. In addition, even when the mini time keys are sequentially published, the security of the unit time decryption key is maintained.

With the above described arrangement, it is possible to build a time key server that is similar to a conventional time server in order to create a unit time key and a mini time key. A user can employ the time key released for public use by the time key server to construct various applications.

For example, a network examination system and an electronic sealed-bid auction system can be constructed. When there are regulations inhibiting reading or the revealing of specific data before a specified time, electronic distribution is made of all of a block of data containing a specific portion that has been encrypted using the time key, and at the specified time, a time decryption key is acquired that can read the contents of the encrypted data.

The time unit employed for the present invention is flexible, i.e., an appropriate time can be selected, such as a unit of one day or a unit of one minute or three minutes. When the mini time key of the present invention is employed, the time key management function does not have to manage a large number of time keys.

DESCRIPTION OF THE PREFERRED EMBODIMENT

Figure 1:
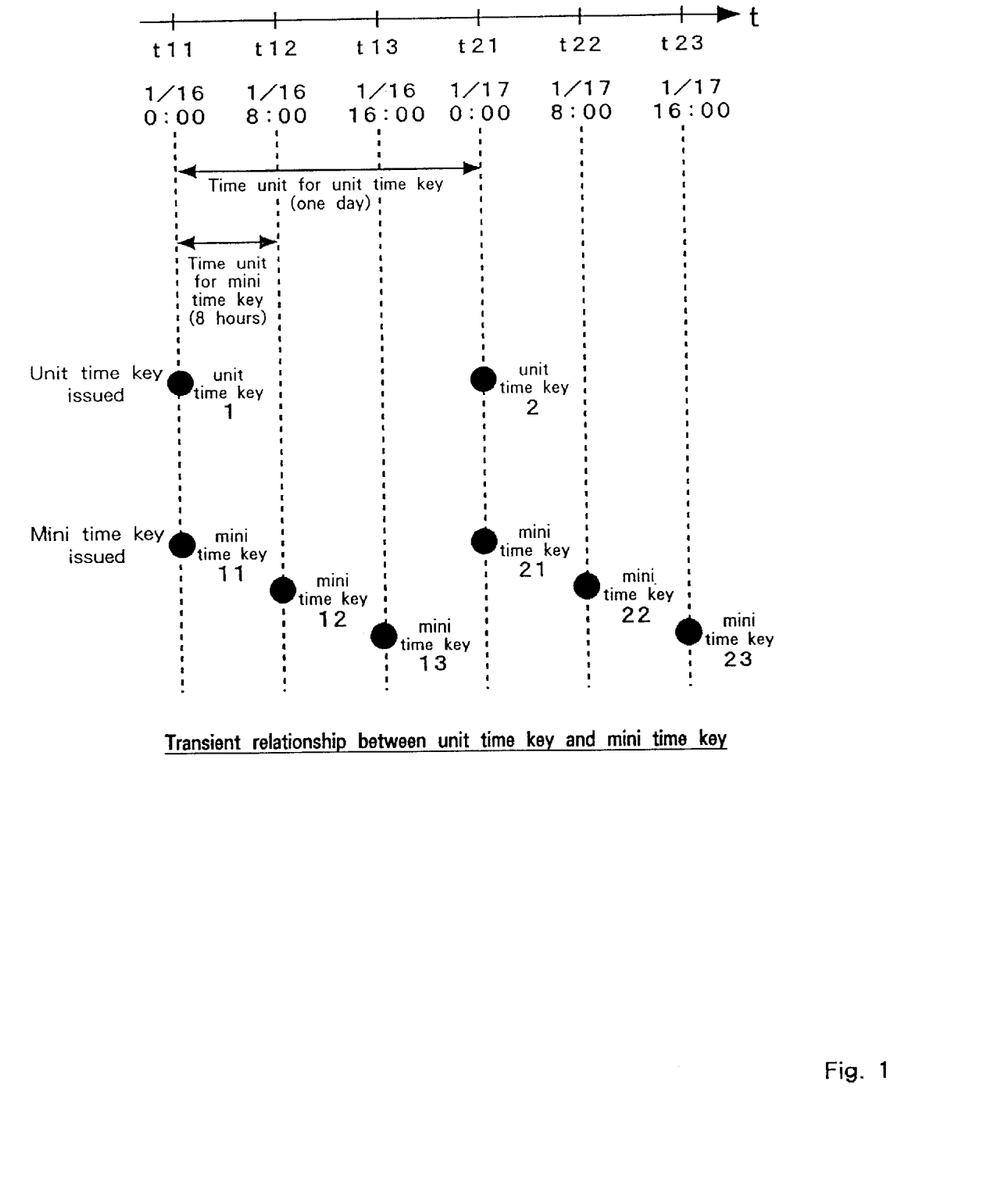
FIG. 1 is a diagram showing the transient relationship between a unit time key and a mini time key.

The terms used in the following embodiment are defined as follows:

time key: A key used for encryption and decryption in accordance with the time. When a decryption key that is used for decrypting encrypted data is released for public use after a specific decryption time period has elapsed, such a key is called a time key. The method for creating the time key and the encryption and decryption methods are the same as those used for an asymmetrical key (e.g., an RSA) and a symmetrical key (e.g., a DES) employed for normal cryptography.

mini time key: A time key for a small time unit that is created from a time key for which the decryption time is based on a longer time unit. In FIG. 1, mini time keys 11–13 and 21–23 correspond to this key.

time encryption key: An encryption key used for data encryption in accordance with the time, regardless of whether it is an asymmetrical key or a symmetrical key.

time decryption key: A decryption key used for data decryption in accordance with the time, regardless of whether it is an asymmetrical key or a symmetrical key.

asymmetrical time encryption key: A public key for an asymmetrical key used for data encryption.

asymmetrical time decryption key: A secret key for an asymmetrical key used for data decryption.

symmetrical time key: A symmetrical key used for data encryption and decryption.

encryption using an asymmetrical encryption key: For data encryption using an asymmetrical key, data are encrypted first using a temporary symmetrical key, and then the symmetrical key is encrypted using an asymmetrical key.

time key management server (system): A special system for managing a time key.

unit time key: A time key that is a base for the creation of a mini time key. The unit time key in this invention can be either an asymmetrical key or a symmetrical key. In FIG. 1, unit time keys 1 and 2 correspond to this key.

unit time: A shortest time interval that can be used for the creation of unit time keys, or mini time keys, that differ from each other. When the unit time of a unit time key is one day, a different time key is created for every day.

subinterval: A subdivision of a unit time period corresponding to a particular mini time key. FIG. 1 thus shows a unit time period of one day (24 hours) divided into three subintervals of 8 hours each.

The descriptions used in the embodiment are defined as follows:

M1 M2: Linking of data M1 and data M2.

$PK_X$: An asymmetrical public key for X (not a time key but a normal public key for signature examination).

$SK_X$: An asymmetrical secret key for X (not a time key but a normal secret key for a signature).

$PK_{X,\ t=t1}$: An asymmetrical time encryption key for X. Decryption time is t1.

$SK_{X,\ t=t1}$: An asymmetrical time decryption key for X. Decryption time is t1.

$K_X$: A symmetrical secret key for X (not a time key but a normal encryption key).

$K_{X,\ t=t1}$: A symmetrical time key for X. Decryption time is t1.

$\{M\}PK_X$: Encryption of data M using an asymmetrical public key for X, or examination of a signature for data M.

$\{M\}PK_{X,\ t=t1}$: Encryption of data M using an asymmetrical time encryption key for X.

$\{M\}SK_X$: Decryption of data M using an asymmetrical secret key for X, or a signature for data M.

$\{M\}SK_{X,\ t=t1}$: Decryption of data M using an asymmetrical time decryption key for X.

$\{M\}K_X$: Encryption of data M using a symmetrical key for X.

$\{M\}K_{X,\ t=t1}$: Encryption of data M using a symmetrical time key for X.

$\{M\}K^{-1}_{X,\ t=t1}$: Decryption of data M using a symmetrical time key for X.

f(M), f'(M): A value of data M obtained using a one-way function f or f'. A property of the one-way function is that it is difficult to acquire the original argument M from the value because a large number of calculations must be performed. For example, a hash function.

Figure 7:
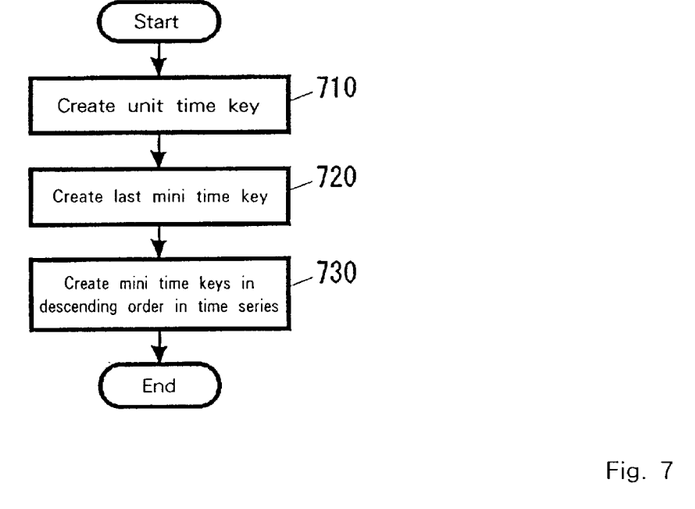
FIG. 7 is a flowchart showing the mini time key creation processing.

FIG. 7 is a flowchart illustrating a mini time key creation system. First, at block 710 a unit time decryption key is created. Then, at block 720 the value of the last mini time key in a time unit to which the mini time key corresponds is calculated (created) by applying a one-way function to the unit time decryption key. At block 730 a desired mini time key is created by applying a one-way function to a mini time key following the desired mini time key.

Figure 8:
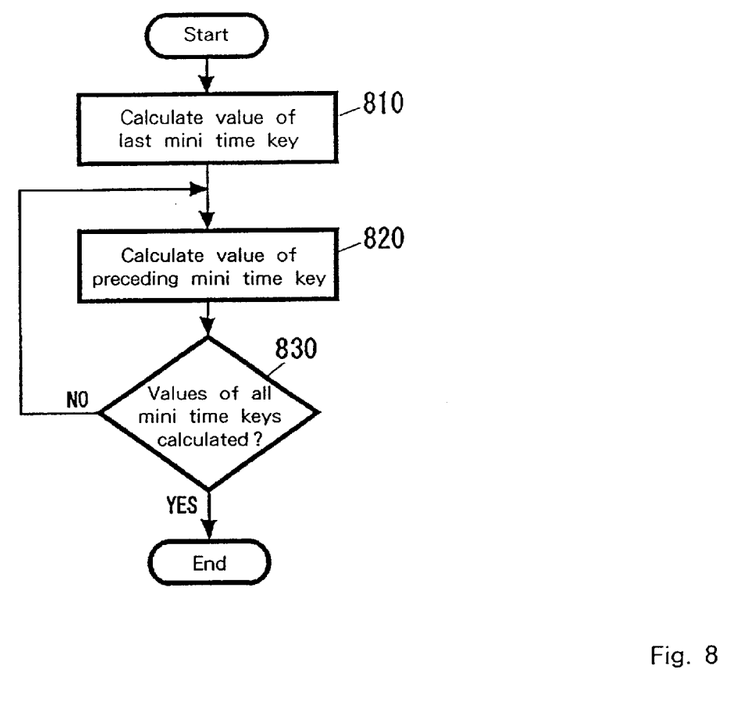
FIG. 8 is a flowchart showing the mini time key creation processing.

FIG. 8 is a flowchart for a mini time key creation method. First, at step 810 a value for the last mini time key in the time unit to which the mini time key corresponds is calculated by applying a one-way function to a unit time decryption key. At step 820 a desired mini time key is created by applying a one-way function to a mini time key following the desired mini time key. At step 830 a check is performed to determine whether the values of all the mini time keys have been calculated. If the decision is NO, program control returns to step 820. When the decision is YES, the processing is thereafter terminated.

Figure 2:
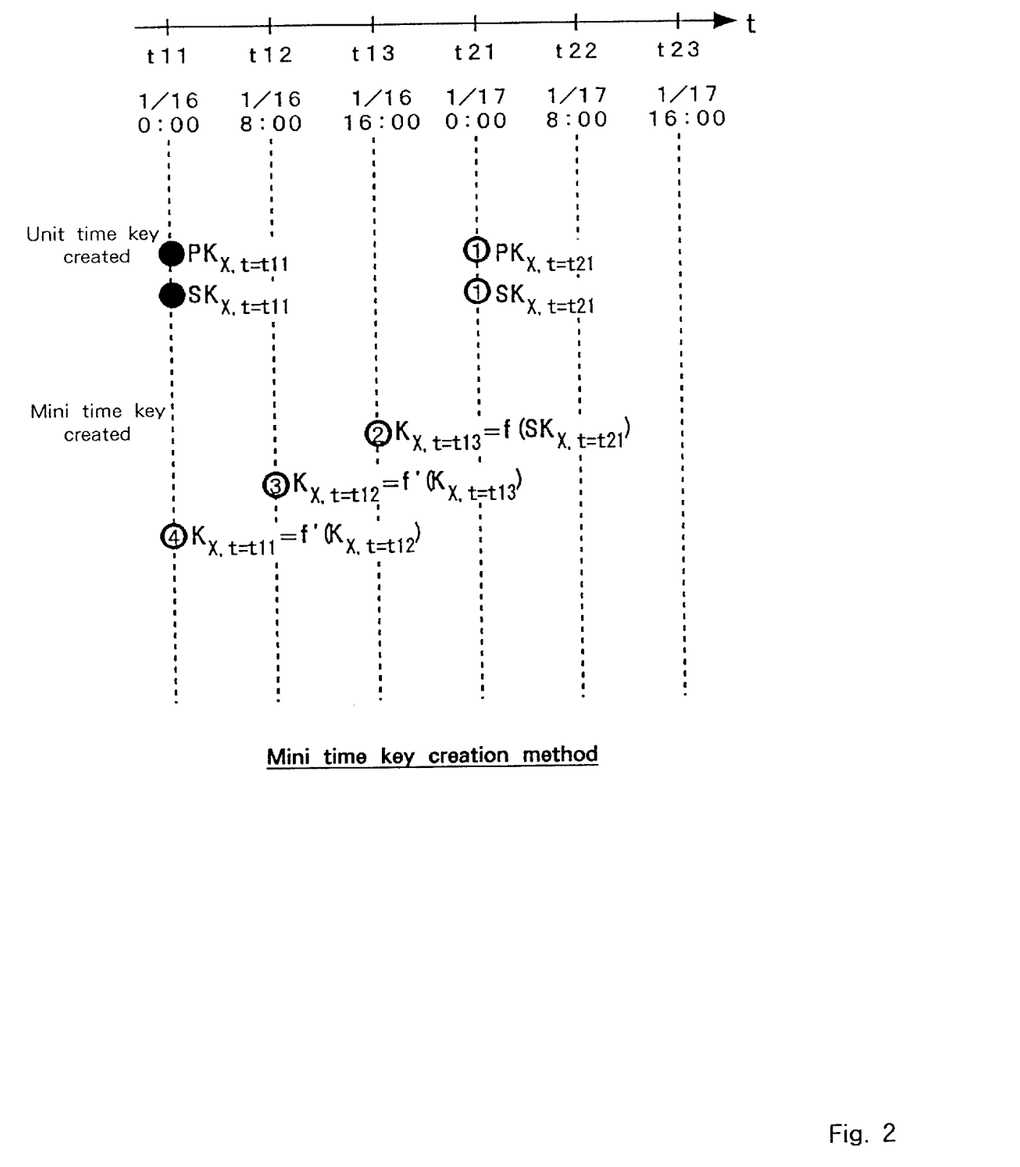
FIG. 2 is a diagram showing a mini time key creation method.

The mini time key creation step, shown in FIG. 2, will now be described more in detail.

Step 1:

A unit time decryption key for t=t2 is created. More specifically, a unit time decryption key is created that is used for a succeeding time unit (t=t2) in the time unit (t1≦t<t2) to which the mini time key corresponds.

Step 2:

The value is calculated for the last mini time key in the time unit to which the mini time key corresponds. The value of the key is defined as one that is obtained by applying the one-way function (f) to the value of the unit time decryption key at step 1.

Step 3:

The value of the mini time key preceding the mini time key obtained at step 2 is defined as being a value acquired by applying the one-way function (f') to the value of the acquired mini time key.

Step 4:

The calculation at step 3 is repeated until the time at which the time unit corresponding to the mini time key starts.

The data encryption method using the mini time key and the unit time key comprises the following steps.

Step 1:

When a time encryption key for decryption time t1 is requested by a time key user, a time key management server transmits a pertinent unit time encryption key $PK_{X, t=t1'}$ (for example, a unit time encryption key for the latest decryption time (t1') that does not exceed t1). It should be noted that step 1 should be selected when the security is a more important consideration, but that it can be skipped.

Step 2:

The time key management server employs a mini time key ($K_{X, t=t1''}$) to encrypt a message (M) received from the user, and transmits $\{M\}K_{X, t=t1''}$ (for example, a mini time encryption key for the first decryption time (t1'') after time t1 has elapsed). When a pertinent $K_{X, t=t1''}$ is not found or is not required, this step can be skipped.

Step 3:

The user employs the acquired unit time key $PK_{X, t=t1'}$ to encrypt data as $\{\{M\}K_{X, t=t1''}\}PK_{X, t=t1'}$. These are the data that are encrypted using the unit time key $PK_{X, t=t1'}$ and the mini time key $K_{X, t=t1''}$.

It should be noted that the above step 3 should be selected when the security is a more important consideration, but that it can be skipped.

The method used for managing (transmitting or storing) the mini time key and the unit time key comprises the following steps.

Step 1:

The time key management server securely holds the unit time decryption key ($SK_{X, t=t11}$) for the decryption time t11 until that time is reached.

Step 2:

When a user of the time key decryption issues a request to the time key management server for decryption at the decryption time t11, the time key management server transmits the unit time decryption key ($SK_{X, t=t11}$) for the decryption time t11. This step is selected only when security is a more important consideration, and need not always be performed.

Step 3:

When a period of time (n*stp) that is a multiple of the unit time (stp) for the mini time key has elapsed after the time t11 is reached, and when the time key management server receives a request from the time key decryption user for decryption for the decryption time t1n (=t11+n*stp), the time key management server transmits a pertinent mini time key ($K_{X, t=t11+n*stp}$) to the user. At this time, the value of the mini time key ($K_{X, t=t11+n*stp}$) can be calculated using the above described mini time key creation step, or the value of the mini time key that is securely stored in the time key management server can be employed.

Step 4:

The time key management server repeats step 3 until time t21 for the next unit time key is reached.

Figure 3:
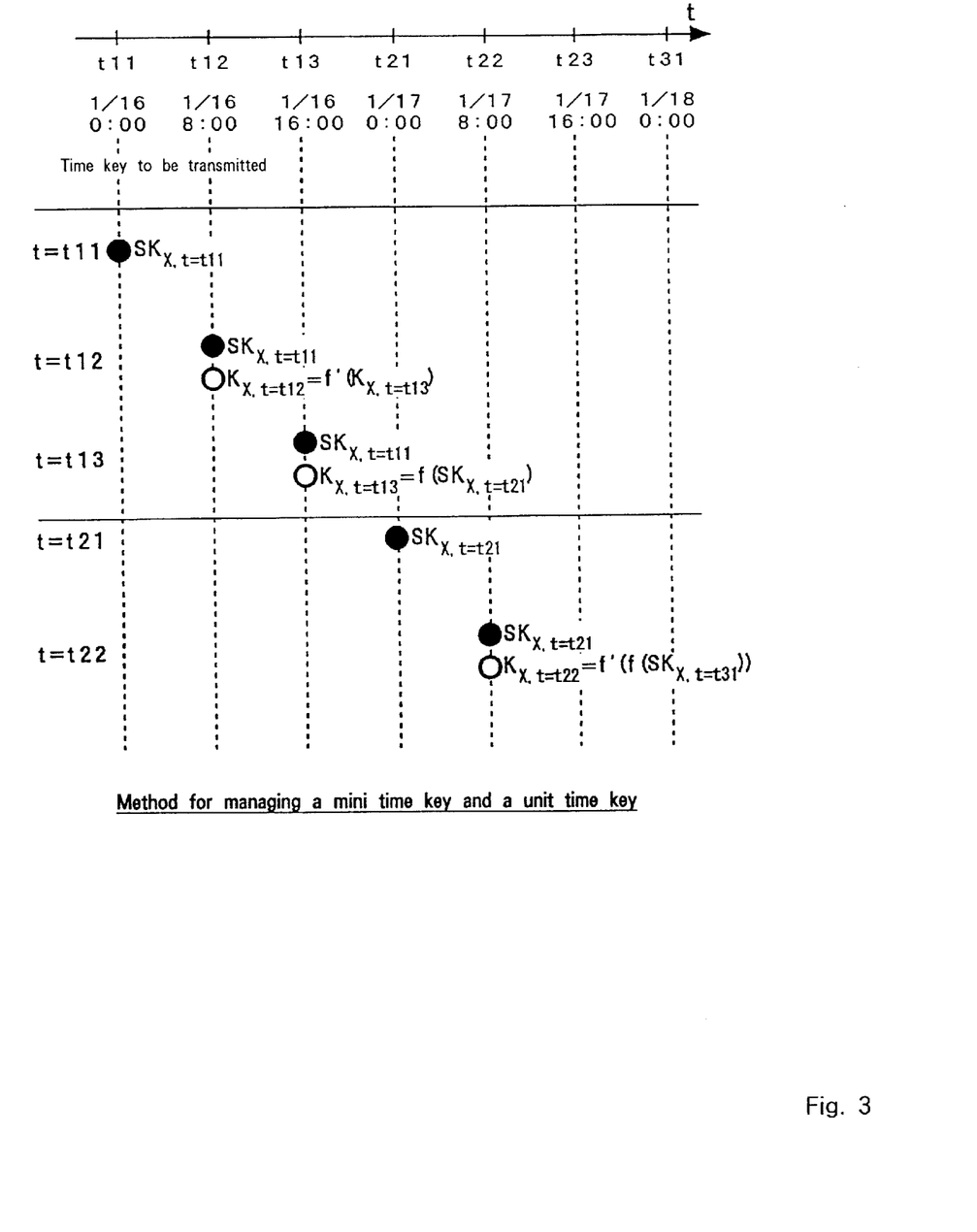
FIG. 3 is a diagram showing, along a time axis, a method for managing a mini time key and a unit time key.

The method used for managing the mini time key and the unit time key follows along the time axis shown in FIG. 3. $SK_{X, t=t11}$ at t=t12, $SK_{X, t=t11'}$ at t=t13, and $SK_{X, t=t21}$ at t=t22 are not always transmitted, and can be selected as needed.

The mini time key management method can be stored before and after the time at which the mini time key is released for public use. For example, before being released for public use, the value of the mini time key may be stored and managed by the server. Instead of being stored, the value of the mini time key may be calculated by the server upon the request for the mini time key.

After the mini time key is released for public use, its value need no longer be managed because the value of the mini time key can be unconditionally acquired from the value of a time unit decryption key using the one-way function (assuming it is released for public use).

The method used for decrypting encrypted data using the mini time key and the unit time key comprises the following steps.

Step 1:

A time key decryption user acquires a unit time decryption key ($SK_{X, t=t11}$) and a mini time key ($K_{X, t=t1n}$) (where t1n=t11+n*stp) in order to decrypt encrypted data E. It should be noted that the acquisition of the unit time decryption key ($SK_{X, t=t11}$) is selective. If the data were encrypted using a unit time encryption key, a unit time decryption key is also acquired.

Step 2:

The user calculates $\{E\}K^{-1}_{X, t=t1n}$, where $K^{-1}_{X, t=t1n} = K_{X, t=t1n}$. The obtained data are the original data. At this step, the user calculates $\{\{E\}SK_{X, t=t11}\}K^{-1}_{X, t=t1n}$ when the data were encrypted using the unit time decryption key and the mini time key.

Figure 9:
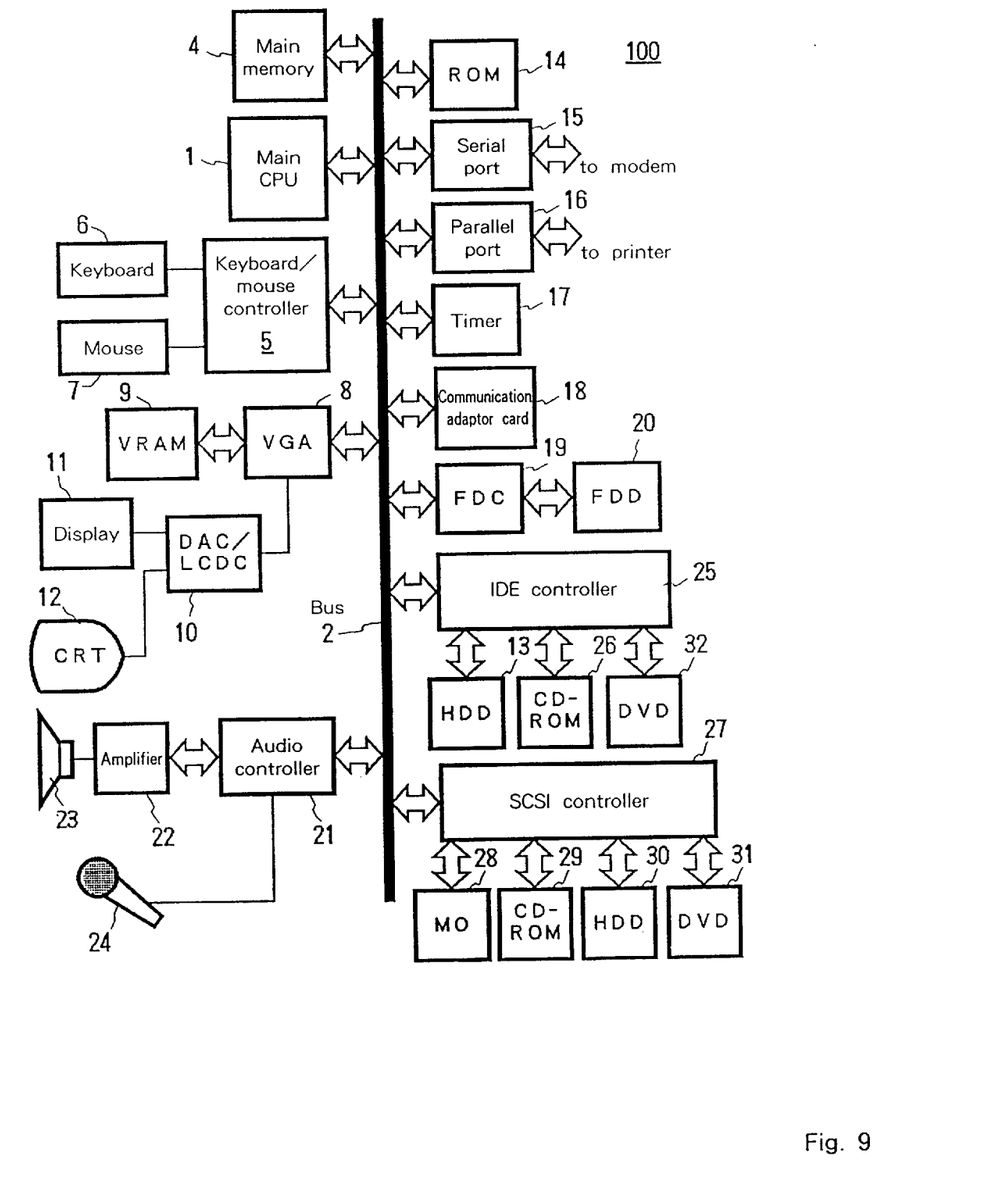
FIG. 9 is a diagram illustrating a hardware arrangement according to one embodiment of the present invention.

The preferred embodiment of the present invention will now be described while referring to the accompanying drawings. In FIG. 9 is shown an example hardware arrangement for a system 100 according to the present invention. The system 100 includes a central processing unit (CPU) 1 and a memory 4. The CPU 1 and the memory 4 are connected via a bus 2 and an IDE controller 25 to a hard disk drive 13 (or to a storage medium driver such as an MO, a CD-ROM or a DVD), which is an auxiliary storage device. Similarly, the CPU 1 and the memory 4 are connected via the bus 2 and a SCSI controller 27 to a hard disk drive 30 (or to a storage medium driver such as an MO 28, a CD-ROM 29 or a DVD 31), which is an auxiliary storage device. A floppy disk drive 20 is also connected to the bus 2 via a floppy disk controller 19. The system 100 performs time key creation, time key management, time key encryption, time key decryption, and time key transmission/reception. A time key management server has the same structure.

A floppy disk is inserted into the floppy disk drive 20, and a computer program code or data, which interacts with an operating system and issues commands to the CPU 1, etc., for implementing the present invention, is stored either on the floppy disk or on a hard disk drive 13 (or a storage medium, such as an MO, a CD-ROM or a DVD) and in a ROM 14, and is loaded into the memory 4 for execution. The computer program code may be compressed, or may be divided into a plurality of segments and stored on a plurality of media.

The system 100 further includes user interface hardware components, such as a pointing device 7 (a mouse or a joystick) or a keyboard 6 for data entry, and a display 11 for providing visual data for a user. A printer and a modem can be connected to the system 100 via a parallel port 16 and a serial port 15, respectively. The system 100 can also be connected to a network via the serial port 15, the modem or a communication adaptor 18 (an ethernet or a token ring card) for communication with other computers. A remote controlled transceiver may be connected to the serial port 15 or to the parallel port 16 for the exchange of data using infrared rays or electric waves.

Via an amplifier 22, a loudspeaker 23 receives an analog audio signal, which is obtained by D/A (digital/analog) conversion performed by an audio controller 21, and outputs it as sound. The audio controller 21 receives audio data from a microphone 24 and performs an A/D (analog/digital) conversion of it, and fetches external audio data.

It can be easily understood that the system 100 of the present invention may be provided as an ordinary personal computer (PC), a workstation, a notebook PC, a palmtop PC, a network computer, a home electric appliance, such as a television that incorporates a computer, a game machine having a communication function, a telephone, a facsimile machine, a portable telephone, a PHS, a communication terminal, including a personal digital assistant, having a communication function, or a combination of such devices. In addition, the previously described components are merely examples; not all the listed components are required for the system 100.

1. Examination System

Example regulations covering the administration of tests incorporate timing factors. With the Test of English for International Communication (TOEIC), for example, a hearing test is administered that continues for several minutes following the start of the examination, and during this time viewing the pages of a writing test is prohibited. When a test is so regulated that the viewing of specific data before a specified time is inhibited, the specific data portion can be encrypted in advance using a time key and the data in which that portion is included can be electronically distributed across a network. When handled in this fashion, it is not necessary to make a real time special distribution of only the specific, pertinent data several minutes later a test has begun, for when the specified time is reached, the time decryption key is supplied and can be used to read the encrypted data. For such timing, however, if one day is employed as the time unit for the time key, it would be extremely difficult to administer an examination. But when a time key is created for which the time unit is one minute, using the method of the present invention an examinee can start a test at any time within the one minute unit time. Also, as one of the advantages afforded by the present invention, the time key management function need not manage a great number of time keys.

A network examination system (FIG. 5) employing a bulletin board system performs the following steps.

Figure 5:
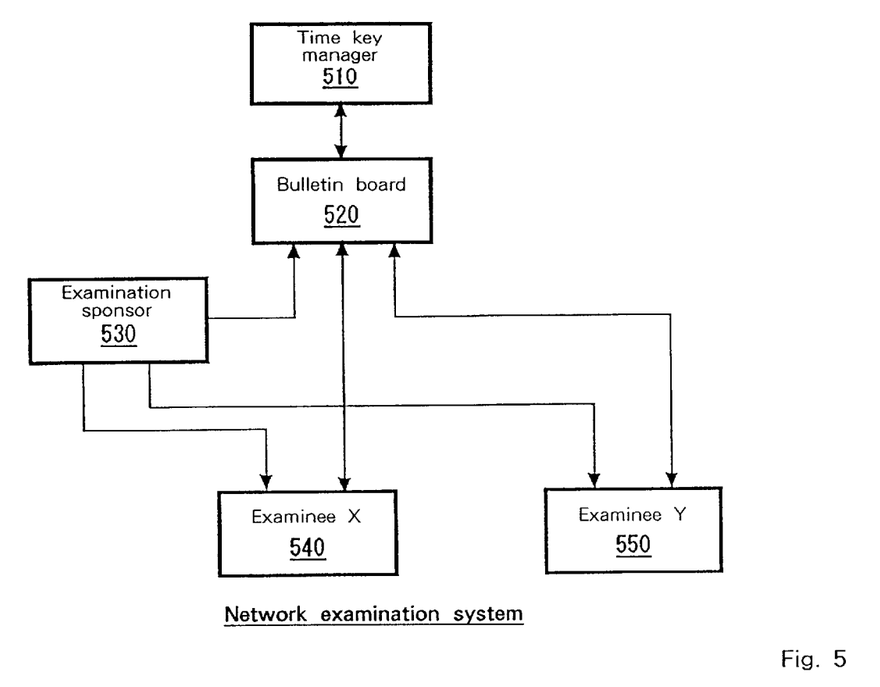
FIG. 5 is a diagram illustrating an example network examination system.

Step 1:

A time key management server (manager) 510 securely stores a unit time decryption key ($SK_{X,\ t=t11}$) for a decryption time t11 until that time is reached. The time key management server securely stores, until time t11, a value (ft2=f ($SK_{X,\ t=t21}$)) obtained by applying the one-way function to the value of the unit time decryption key ($SK_{X,\ t=t21}$) for the time unit following the decryption time t11.

Step 2:

When the time t11 has elapsed, the time key management server 510 posts on a bulletin board 520 the unit time decryption key ($SK_{X,\ t=t11}$) for the time t11.

Step 3:

When a period of time, (n*stp), that is a multiple of the unit time (stp) for the mini time key has elapsed following time t11, the time key management server 510 releases for public use the mini time key ($K_{X,\ t=t1n}$) for the decryption time t1n.

Step 4:

The time key management server 510 repeats step 3 until time t21 for the next unit time key is reached.

In FIG. 5, the time key management server 510 creates a unit time key for one day and mini time keys for one minute each, and every minute posts on the bulletin board 520 the unit time key and the mini time key. Upon receipt of an examination request from an examinee X (540), an examination sponsor 530 uses a mini time key to encrypt one part of the questions for an examination, and transmits the entire examination to the examinee X. In this case, the examinee X should be prepared to begin the examination five minutes, for example, after receiving the data. Five minutes after the data is received, the examinee X can acquire from the bulletin board 520 a mini time decryption key to be used for the encrypted data on the first page of the test, and will then be able to begin the examination. Then, 40 minutes after the test began, the examinee X can acquire from the bulletin board 520 a mini time decryption key to be used for the encrypted data in the next section of the test, and can start the next section. An examinee Y (550) independently of the examinee X and the sponsor, can also begin the examination at any time within the one minute unit time.

2. Electronic Sealed-Bid Auction System

An electronic sealed-bid auction system is a system whereby when a bid is submitted, the offered price is enclosed in a special electronic envelope that remains sealed until a specified time. In this case, a time key is employed as a special electronic envelope, and the offered price should be securely stored, so that it can not be decrypted until a specified decryption time. In order to reduce the time unit for the decryption time, a unit time key and a mini time key are employed that use the method of the present invention. Thus, the publication time can be determined by using a one minute unit, and flexible bidding rules can be set. Since the method of the present invention is employed, the time unit for the decryption time can be shortened, and the number of keys that the time key management center must manage is not increased.

Figure 6:
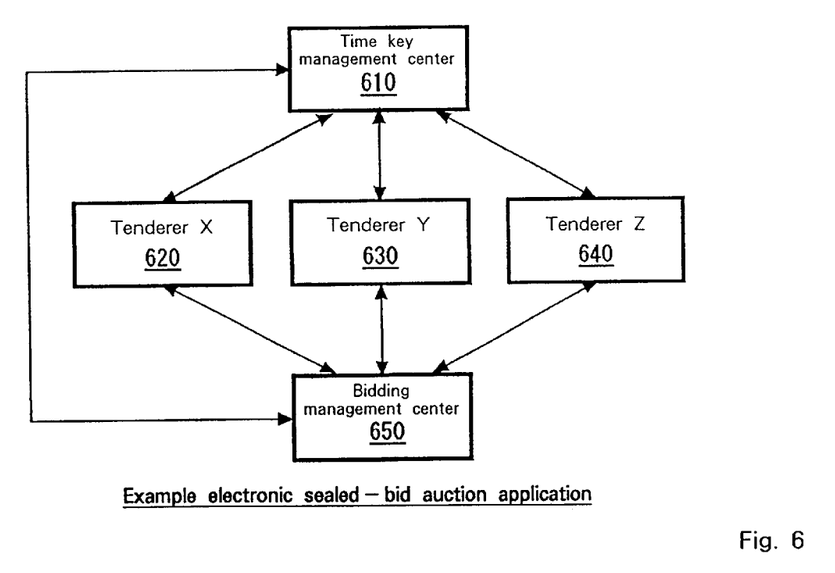
FIG. 6 is a diagram illustrating an example electronic sealed-bid auction application process.

In FIG. 6 is shown an example electronic sealed-bid auction application process. A tenderer X (620) acquires a unit time encryption key for a decryption time t1 and a mini time encryption key from a time key management center 610, and uses them to encrypt a bidding price. The tenderer 620 then transmits the encrypted bidding price to the bidding management center 650. Other tenderers, such as the tenderers Y (630) and Z (640) shown, may submit bids in a similar manner. After the elapse of the decryption time t1, the bidding management center 650 acquires a unit time decryption key and a mini time decryption key from a time key management center 610 and uses them to decrypt the received encrypted information. When all the bid prices have been decrypted, the lowest bid price can be selected as the contract price, and the bidding management center 650 can then announce the results of the bidding.

Advantages of the Invention

When the mini time key of the present invention is employed, the time unit for decryption can be shortened without increasing the number of time keys that the time key management server must manage.

Figure 4:
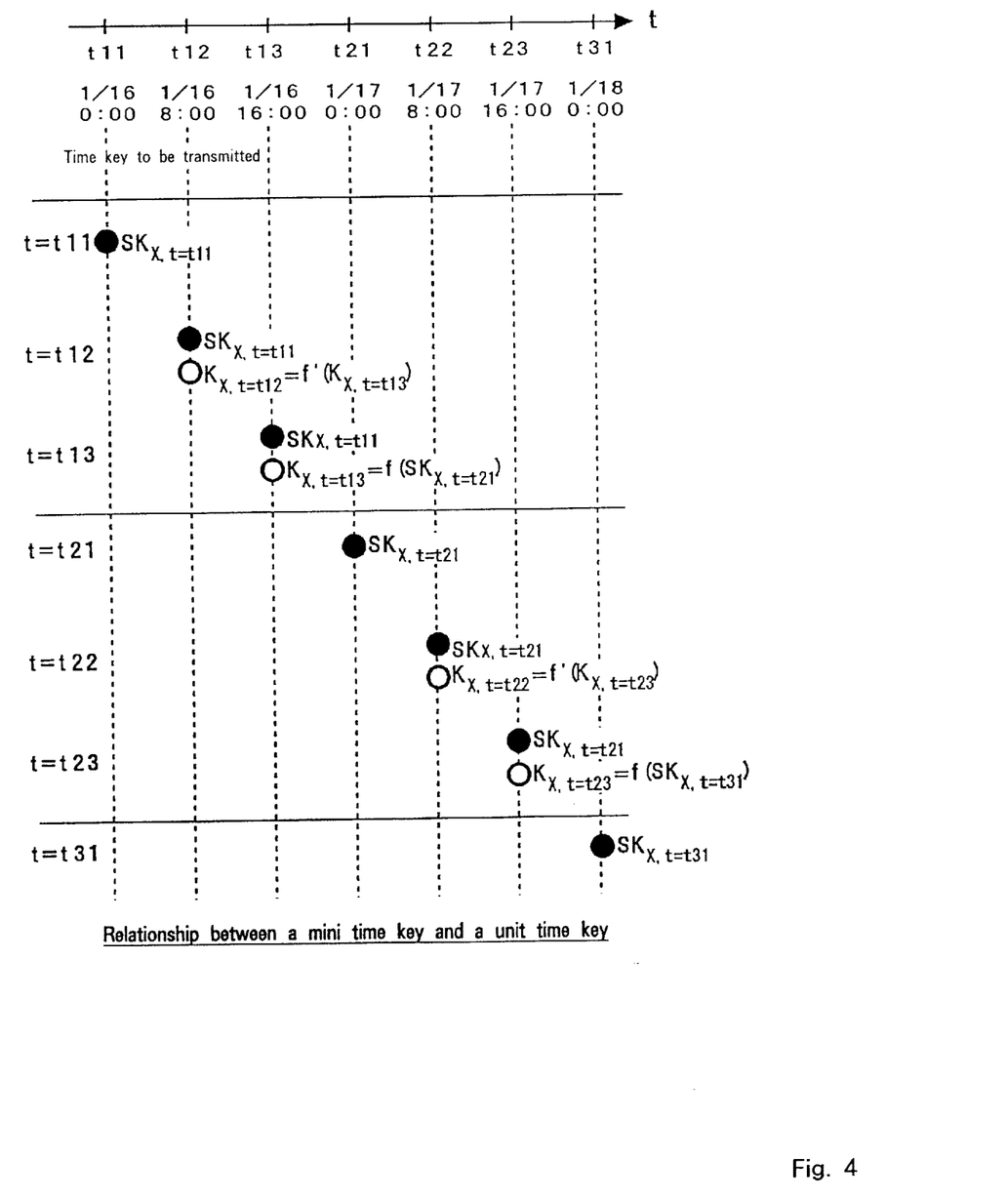
FIG. 4 is a diagram showing the relationship between a mini time key and a unit time key.

In FIG. 4, the time keys that the time key management server must manage during the period extending from t11 to t31 include only $SK_{X,\ t=t11}$ and $SK_{X,\ t=t21}$. The mini time keys $K_{X,\ t=t12}$, $K_{X,\ t=t13}$, $K_{X,\ t=t22}$ and $K_{X,\ t=t23}$ need not be managed because after the time (t21), when the mini time key $SK_{X,\ t=t21}$ is released for public use, the mini time keys $K_{X,\ t=t12}$ and $K_{X,\ t=t13}$ can be easily calculated using the one-way function (f, f'). Similarly, after the time (t31), when the mini time key $SK_{X,\ t=t31}$ is released for public use, the mini time keys $K_{X,\ t=t22}$ and $K_{X,\ t=t23}$ can be easily calculated using the one-way function (f, f'). When the mini time key $K_{X,\ t=t12}$ is released for public use at time (t12), while taking into account the property of the one-way function, it is difficult to calculate the value of the unit time decryption key $SK_{X,\ t=t21}$ using only the value of the mini time key. Therefore, the security of the unit time decryption key is maintained even when the mini time keys are sequentially released for public use.

What is claimed is:

1. A system for creating a plurality of mini time keys for respective subintervals of a unit time period, comprising:
   (1) a decryption key creator for creating a unit time decryption key for said unit time period;
   (2) a last mini time key creator for creating a mini time key for a last subinterval of said unit time period by applying a one-way function to said unit time decryption key; and (3) an additional mini time key creator for creating a mini time key for each of a plurality of additional subintervals of said unit time period by recursively applying a one-way function to a mini time key created for an immediately following subinterval of said unit time period, beginning with said last subinterval of said unit time period and ending with a first subinterval of said unit time period.

2. The system according to claim 1 in which said unit time decryption key is created immediately after said unit time is reached.

3. The system according to claim 1 in which said mini time keys are released at staggered instants of time corresponding to the subintervals for which they were created.

4. An encryption system for encrypting messages using a mini time key for a requested time comprising:

(1) a mini time key creator for creating a mini time key for a last subinterval of a unit time period by applying a one-way function to a unit time decryption key created for said unit time period;

(2) a mini time key creator for creating a mini time key for each of a plurality of additional subintervals of said unit time period by recursively applying a one-way function to a mini time key created for an immediately following subinterval of said unit time period, beginning with said last subinterval of said unit time period and ending with a first subinterval of said unit time period; and (3) a message encryptor for encrypting a message using said mini time key.

5. The encryption system according to claim 4 in which said unit time decryption key is created immediately after said requested time is reached.

6. The encryption system according to claim 4, further comprising:

(4) an encryptor for employing a unit time encryption key to encrypt said message that has been encrypted using said mini time key.

7. A method for creating a plurality of mini time keys for respective subintervals of a unit time period, comprising the steps of:

(1) creating a unit time decryption key for said unit time period;

(2) creating a mini time key for a last subinterval of said unit time period by applying a one-way function to said unit time decryption key; and (3) creating a mini time key for each of a plurality of additional subintervals of said unit time period by recursively applying a one-way function to a mini time key created for an immediately following subinterval of said unit time period, beginning with said last subinterval of said unit time period and ending with a first subinterval of said unit time period.

8. The method according to claim 7 in which said unit time decryption key is created immediately after said unit time is reached.

9. The method according to claim 7 in which said mini time keys are released at staggered instants of time corresponding to the subintervals for which they were created.

10. A memory medium for storing a mini time key creation program for creating a plurality of mini time keys for respective subintervals of a unit time period, said program comprising:

(1) a decryption key creation function for creating a unit time decryption key for said unit time period;

(2) a last mini time key creation function for creating a mini time key for a last subinterval of said unit time period by applying a one-way function to said unit time decryption key; and (3) an additional mini time key creation function for creating a mini time key for each of a plurality of additional subintervals of said unit time period by recursively applying a one-way function to a mini time key created for an immediately following subinterval of said unit time period, beginning with said last subinterval of said unit time period and ending with a first subinterval of said unit time period.

11. The encryption system according to claim 4 in which said mini time keys are released at staggered instants of time corresponding to the subintervals for which they were created.

12. The memory medium according to claim 10 in which said mini time keys are released at staggered instants of time corresponding to the subintervals for which they were created.

* * * * *